United States Patent [19]

Hoshinouchi et al.

[11] Patent Number: 4,689,466

[45] Date of Patent: Aug. 25, 1987

[54] LASER-BEAM OPERATED MACHINING APPARATUS

[75] Inventors: Susumu Hoshinouchi, Hyogo; Masaru Kanaoka, Aichi; Atsushi Fukada, Hyogo, all of Japan

[73] Assignee: Mitsubishi Denki Kabushiki Kaisha, Tokyo, Japan

[21] Appl. No.: 721,628

[22] Filed: Apr. 10, 1985

[30] Foreign Application Priority Data

Apr. 10, 1984 [JP] Japan ................................. 59-71295

[51] Int. Cl.$^4$ .............................................. B23K 26/00
[52] U.S. Cl. ........................ 219/121 L; 219/121 LA; 219/121 LQ; 219/121 FS
[58] Field of Search .... 219/121 L, 121 LM, 121 PW, 219/121 FS, 121 LA, 121 LE, 121 LF, 121 LP, 121 LQ, 121 LR, 121 LH, 118

[56] References Cited

U.S. PATENT DOCUMENTS

| | | | |
|---|---|---|---|
| 3,597,578 | 8/1971 | Sullivan | 219/121 LN X |
| 3,809,850 | 5/1974 | Saenger, Jr. | 219/121 PN X |
| 3,906,289 | 9/1975 | Lepp et al. | 219/121 PW X |
| 3,997,756 | 12/1976 | Bykhovsky et al. | 219/121 PW |
| 4,010,345 | 3/1977 | Banas et al. | 219/121 FS |
| 4,142,089 | 2/1979 | Lau et al. | 219/121 PW X |
| 4,167,662 | 9/1979 | Steen | 219/121 FS X |
| 4,224,499 | 9/1980 | Jones | 219/118 X |

FOREIGN PATENT DOCUMENTS

| | | | |
|---|---|---|---|
| 0091893 | 6/1982 | Japan | 219/121 FS |
| 0047085 | 3/1984 | Japan | 219/121 FS |

OTHER PUBLICATIONS

Tooling and Production, "Inside the Laser Tool", vol. 44, Mar. 79, No. 12, pp. 84,85 (Copy in 219/121 FS).
Processings of International Conference on Welding Research in the 1980's–International Conference Committee, Sep., 1980.

*Primary Examiner*—C. L. Albritton
*Attorney, Agent, or Firm*—Sughrue, Mion, Zinn, Macpeak, and Seas

[57] ABSTRACT

A laser-beam operated machining apparatus capable of performing machining operations on a high-reflectivity material such as aluminum or copper. A nozzle is provided for applying a focused laser beam together with an assist gas to a surface of a workpiece to be machined. An annular electrode is provided on the end of the nozzle confronting the workpiece with the electrode being coaxial with the laser beam. An arc discharge is created between the annular electrode and the workpiece by applying a voltage between the annular electrode and the workpiece so as to cause an arc discharge therebetween.

14 Claims, 4 Drawing Figures

LASER-BEAM OPERATED MACHINING APPARATUS

BACKGROUND OF THE INVENTION

The present invention relates to a laser-beam operated machining apparatus which performs machining operations with a high energy density laser beam. More particularly, the invention relates to a laser-beam operated machining apparatus in which the machining efficiency is much higher than that of a conventional apparatus.

A conventional laser-beam operated machining apparatus of the same general type to which the invention relates is depicted in FIG. 1, which shows a sectional view of portions thereof. In FIG. 1, reference number 1 designates a laser oscillator; 2, a laser beam outputted by the laser oscillator 1; 3, a mirror for reflecting the laser beam toward a machining section; 4, a focusing optical system, namely, a focusing lens, for focusing the laser beam to an energy density suitable for machining; and 5, a nozzle provided below the focusing optical system 4 for applying the laser beam 2 together with assist gas to a workpiece 7. The nozzle 5 has an assist gas supplying port 6 for supplying various assist gases separately according to the particular machining purpose at hand. The nozzle 5 is in the form of a reverse cone coaxial with the laser beam 2.

The operation of the apparatus in FIG. 1 will be described. The laser beam 2 emitted by the laser oscillator 1 is reflected by the mirror 3. The reflected laser beam 2 is focused by the focusing optical system 4 into a spot having a high energy density of typically $10^6$ to $10^8$ W/cm$^2$. The spot is applied to the surface of the workpiece 7, thus cutting, welding or heating the latter. In this operation, the assist gas is supplied through the assist gas supplying port 6 to the nozzle 5 so that it is applied to the surface of the workpiece 7 in such a manner that its flow is coaxial with the laser beam.

In cutting a workpiece, $O_2$ gas is usually employed as the assist gas. In this case, oxidation reaction heat is generated between the $O_2$ gas and the workpiece and material of the workpiece rendered molten and removed accordingly. In welding or heating a workpiece, Ar gas is employed to protect the workpiece's surface from oxidation by the air.

As is apparent from the above description, machining a workpiece with a laser beam is advantageous in that, since the high energy density of the focused laser beam can be utilized to evaporate, melt or heat a workpiece quickly, the workpiece can be machined in various manners with high efficiency.

The absorption factor of a laser beam depends greatly on its wavelength. FIG. 2 indicates the reflectivities of a variety of mirror-finished materials with respect to rays of different wavelengths. For a $CO_2$ laser beam having an infrared wavelength of 10.6 microns, the reflectivity for most materials is considerably large. Accordingly, with a $CO_2$ laser beam with a power density in a range suitable for machining, a material such as steel of relatively low reflectivity (the reflectivity being about 90% for a mirror-finished surface and 60% for a rough machined surface) can be machined with high efficiency. However, a material such as aluminum or copper of high reflectivity (the reflectivity being of the order of 90% even for a rough machined surface) cannot be machined. Thus, the range of application of a $CO_2$ beam to machining work is greatly limited.

SUMMARY OF THE INVENTION

An object of the invention is thus to eliminate the above-described difficulty accompanying a conventional laser-beam operated machining apparatus.

In accordance with this and other objects, the invention provides a laser-beam operated machining apparatus in which an annular electrode is provided on the end of a nozzle mounted so that it is coaxial with the laser beam, and a voltage is applied between the annular electrode and the workpice to cause an arc discharge therebetween, thereby to produce a plasma which can efficiently absorb the laser beam. With this arrangement, even a material high in reflectivity can be machined with a laser beam with high efficiency.

DESCRIPTION OF THE PREFERRED EMBODIMENTS

A preferred embodiment of the invention will be described with reference to the accompanying drawings.

Figure 1:
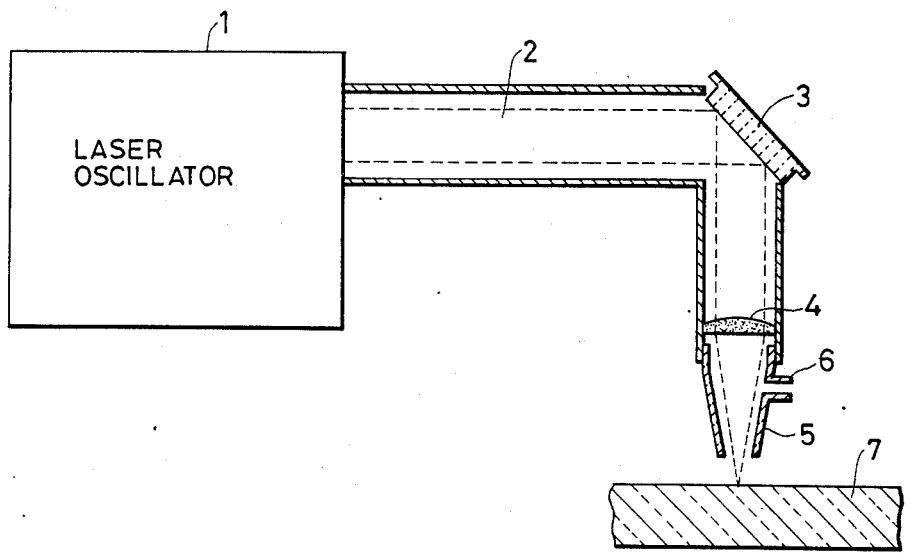
FIG. 1 is a vertical sectional view showing a conventional laser-beam operated machining apparatus.
Figure 2:
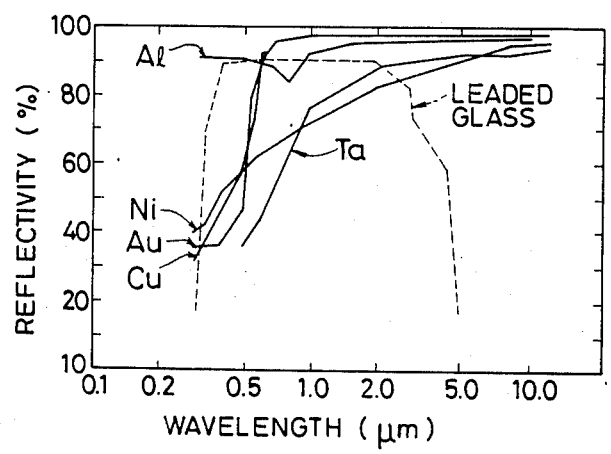
FIG. 2 is a characteristic diagram indicating the reflectivities of various materials with respect to laser beams.
Figure 3:
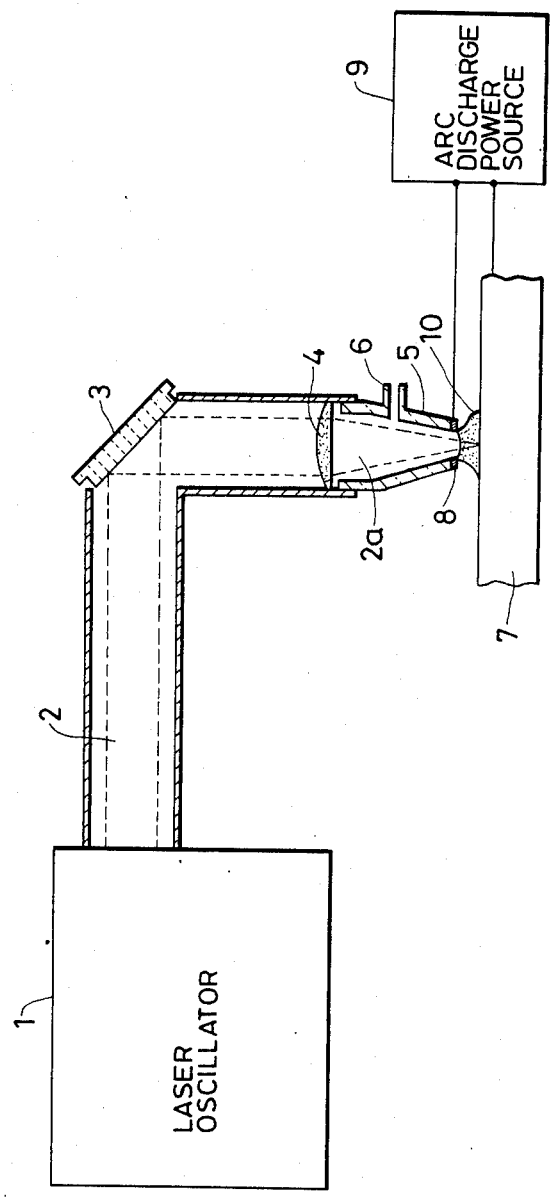
FIG. 3 is a vertical sectional view showing an example of a laser-beam operated machining apparatus according to the invention.

FIG. 3 is a sectional view showing an example of a laser-beam operated machining apparatus according to the invention. In FIG. 3, 2a designates a laser beam focused by a focusing optical system 4; 5, a nozzle in the form of a reverse cone which is coaxial with the laser beam and is made of electrically insulating material; 8, an annular electrode which is provided on the end of the nozzle 5 and is coaxial with the laser beam; and 9, an arc discharge power source for applying a voltage between the annular electrode 8 and a workpiece 7 to cause an arc discharge therebetween.

The operation of the apparatus thus constructed will be described.

The laser beam 2 outputted by the laser oscillator 1 is reflected by the mirror 3. The reflected laser beam 2 is focused by the focusing optical system 4 into a spot of high energy density. The spot is applied to the workpiece 7. During the emission of the laser beam 2 by the laser oscillator, a voltage is applied between the workpiece 7 and the annular electrode 8 by the arc discharge power source, as a result of which, in association with the action of assist gas supplied through the assist gas supplying port 6, arcing is generated between the annular electrode 8 and the workpiece 7. The assist gas is heated to high temperature by the arcs. As a result, a part of the assist gas is dissociated into a high temperature gas plasma 10 surrounding the focused laser beam 2a. The gas plasma 10 is jetted onto the surface of the workpiece 7 at the position of the laser beam spot.

As is apparent from the above description, the inventive apparatus is designed so that the focused laser beam 2a and the high temperature gas plasma formed in such a manner as to surround the focused laser beam 2a are simultaneously applied to the same part of the workpiece 7. As a result, the apparatus has the following considerably practical effects:

(1) The high temperature gas plasma has a considerably high laser beam absorption factor, the gas plasma 10 is in contact with the machining surface, and heat is effectively transmitted from the gas plasma to the surface of the workpiece 7. Therefore, even a material such as aluminum or copper, which cannot be machined by the conventional apparatus because it is extremely high in reflectivity, can be efficiently machined because the energy of the laser beam reflected from the surface of the workpiece 7 is absorbed by the gas plasma and heat is transmitted from the high temperature gas plasma to the surface of the workpiece.

(2) Since the material of the workpiece is heated by an arc discharge, the base metal temperature is increased, which improves the efficiency of machining operations such as cutting and welding.

(3) In the conventional apparatus, the machining operation is carried out with assist gas at room temperature or cooled to a low temperature by the adiabatic expansion of the gas. On the other hand, the apparatus of the invention uses an assist gas which is heated to a high temperature by arc discharge. Therefore, the part of the workpiece being machined is never cooled by the assist gas, which improves the efficiency of machining operations such as cutting and welding.

(4) Since the annular electrode 8 is in the form of a ring coaxial with the laser beam, the plasma is distributed coaxially with respect to the laser beam. In addition, no anisotropy occurs even if the laser beam or the workpiece 7 is moved in any direction, and therefore high-quality machining operations can be achieved in all directions.

A DC power source with a welding high frequency starter is most suitable as the arc discharge power source 9 in the above-described embodiment. If a low distortion, precision welding operating is to be carried out with a relatively low power laser beam, a pulse power source may be employed in order to prevent over-heating by the arc discharge. A power output of typically 1800VA (150V, 12A) is suitable.

Figure 4:
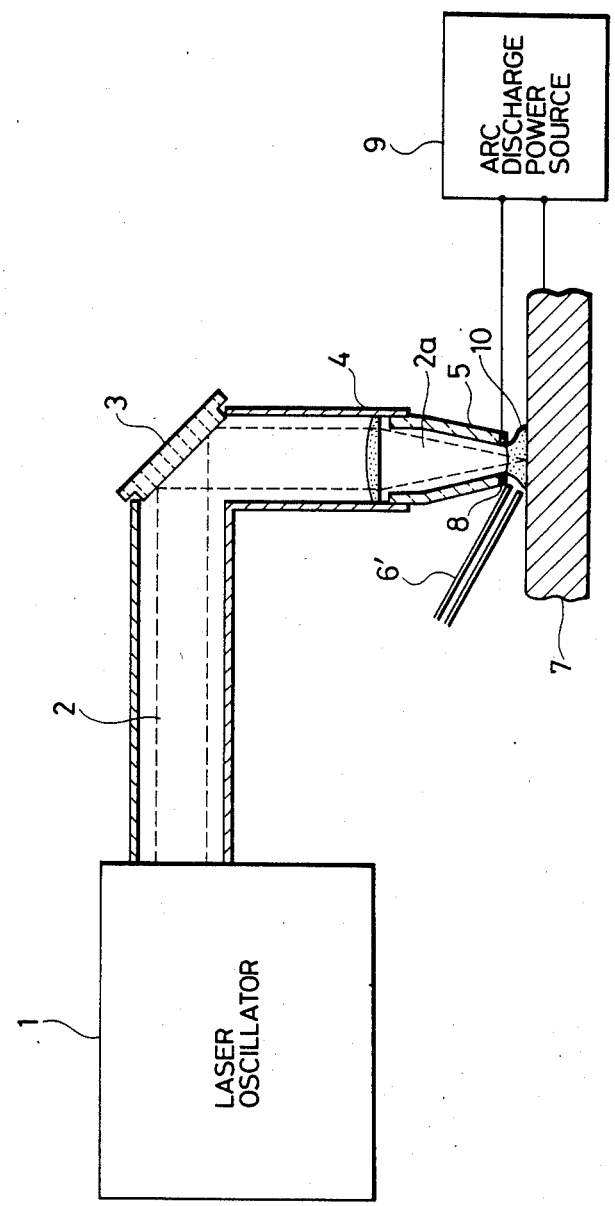
FIG. 4 is a view similar to FIG. 3 showing an alternative embodiment of the invention.

In the above-described embodiment, the nozzle with the assist gas supplying port 6 is used. However, the assist gas supplying port may be provided at a position other than through the nozzle. In such a case also, the apparatus can be constructed in the same manner to generate the gas plasma, thereby to improve the efficiency of the machining operation. An example of such a modified apparatus is shown in FIG. 4, wherein a gas supply pipe 6' debouches near the opening of the nozzle 5.

As is apparent from the above description, according to the invention, an annular electrode is provided on the end of the nozzle in such a manner coaxial with the laser beam, and a voltage is applied between the annular electrode and the workpiece to cause an arc discharge therebetween. The assist gas becomes a high temperature gas plasma which surrounds the focused laser beam. Accordingly, the efficiency of the machining operation is remarkably improved, and a material such as aluminum or copper having a high reflectivity can be machined with the apparatus of the invention.

What is claimed is:

1. A laser-beam operated machining apparatus comprising:
   a laser oscillator (1);
   a focusing optical system (4) for focusing a laser beam emitted by said laser oscillator;
   a nozzle (5) for applying an assist gas together with said laser beam to a surface of an electrically conductive workpiece (7);
   an annular electrode (8) provided on an end of said nozzle adjacent said workpiece, said electrode being coaxial with said laser beam; and
   an arc discharge power source (9) for applying a voltage between said annular electrode and said workpiece to cause an arc discharge therebetween, wherein said arc discharge power source comprises a pulse power source.

2. The apparatus as claimed in claim 1, wherein said nozzle has an assist gas supplying port.

3. A laser-beam operated machining apparatus comprising:
   a laser oscillator for emitting a laser beam;
   a focusing optical system for focusing said laser beam and applying the focused laser beam to an electrically conductive workpiece;
   a primary nozzle having a longitudinal axis coaxial with said focused laser beam;
   means for supplying an assist gas to said primary nozzle to apply said assist gas to a machining part of said workpiece;
   an annular electrode provided on an end of said primary nozzle which confronts said workpiece, said annular electrode being coaxial with said laser beam; and
   an arc discharge power source for applying a voltage between said annular electrode and said workpiece to cause an arc discharge therebetween, wherein said arc discharge power source comprises a pulse power source.

4. The apparatus as claimed in claim 3, wherein said focusing optical system comprises a focusing lens.

5. The apparatus as claimed in claim 3, further comprising mirror means for applying said laser beam emitted by said laser oscillator to said focusing optical system.

6. The apparatus as claimed in claim 3, wherein said nozzle has an assist gas supplying port, said nozzle applying an assist gas to a machining part of said workpiece.

7. The apparatus as claimed in claim 3, wherein said means for applying an assist gas comprises an assist gas supplying nozzle (6') provided distinct from said primary nozzle.

8. The apparatus as claimed in claim 3, wherein said assist gas is $O_2$ gas.

9. The apparatus as claimed in claim 3, wherein said assist gas is an inert gas.

10. The apparatus as claimed in claim 9, wherein said inert gas is Ar gas.

11. The apparatus as claimed in claim 3, wherein said workpiece is made of at least one of aluminum and copper.

12. The apparatus as claimed in claim 3, wherein said arc discharge power source comprises a DC power source having a welding high frequency starter.

13. The apparatus as claimed in claim 1, wherein the laser beam comprises $CO_2$ and wherein the workpiece has a surface reflectivity of not less than approximately 90%.

14. The apparatus as claimed in claim 3, wherein the laser beam comprises $CO_2$ and wherein the workpiece has a surface reflectivity of not less than approximately 90%.

* * * * *